United States Patent [19]

Knowles

[11] Patent Number: 5,162,618
[45] Date of Patent: Nov. 10, 1992

[54] ACOUSTIC TOUCH POSITION SENSOR WITH FIRST ORDER LAMB WAVE REFLECTIVE ARRAYS

[75] Inventor: Terence J. Knowles, Hanover Park, Ill.

[73] Assignee: Exzec, Inc., Evanston, Ill.

[21] Appl. No.: 614,860

[22] Filed: Nov. 16, 1990

[51] Int. Cl.$^5$ ............................................. G08C 21/00
[52] U.S. Cl. .................................... 178/18; 367/907
[58] Field of Search .................... 178/18, 19; 340/706, 340/702; 267/907

[56] References Cited

U.S. PATENT DOCUMENTS

| 3,673,327 | 6/1972 | Johnson et al. | 178/18 |
|---|---|---|---|
| 3,883,831 | 5/1975 | Williamson et al. | 333/30 |
| 4,642,423 | 2/1987 | Adler | 178/18 |
| 4,644,100 | 2/1987 | Brenner et al. | 178/18 |
| 4,645,870 | 2/1987 | Adler | 178/19 |
| 4,700,176 | 10/1987 | Adler | 340/365 |
| 4,746,914 | 5/1988 | Adler | 340/712 |
| 4,791,416 | 12/1988 | Adler | 340/712 |
| 4,880,665 | 11/1989 | Adler et al. | 427/126.3 |

OTHER PUBLICATIONS

"The IMCON Pulse Compression Filter and Its Application," Tom A. Martin, *IEEE Transactions on Microwave Theory and Techniques*, vol. MTT-21, No. 4, Apr. 1973.
"Ultrasonic Delay Lines Using Shear Modes In Strips," A. H. Meitzler, *IRE Transactions On Ultrasonics Engineering*, Jun. 1960.
"The Use of Surface-Elastic-Wave Reflective Gratings in Large Time-Bandwidth Pulse-Compression Filters," Richard C. Williamson and Henry I. Smith, *IEEE Transactions on Microwave Theory and Techniques*, vol. MTT-21, No. 4, Apr. 1973.
"Large-Time-Bandwidth-Product Surface Wave Pulse Compressor Employing Reflective Gratings," R. C. Williamson et al., *Electronics Letters*, vol. 8, No. 16, Aug. 10, 1972.
"A Closed-Form Analysis of Reflective-Array Gratings," P. V. Wright, *IEEE Ultrasonics Symposium*, 1980.
"An Economical Touch Panel Using SAW Absorption," Robert Adler, and Peter J. Desmares, *IEEE Transactions on Ultrasonics, Perroelectrics, and Frequency Control*, vol. UFFC-34, No. 2, Mar. 1987.
"Mechanical Input Admittance of Ultrasonic Delay Lines Operating In Torsional Or Shear Modes," Morio Onoe, *The Journal of The Acoustical Society of America*, vol. 35, No. 7, pp. 1003–1008, Jul. 1963.
"On Waves In An Elastic Plate," Horace Lamb, F. R. S., (Received Jul. 10, 1916).
*Physical Acoustics—Principles and Methods*, Warren P. Mason, Academic Press, vol. 1–Part A, Chapter 2 and 6; 1964.
*Rayleigh and Lamb Waves—Physical Theory and Applications*, Igor Aleksandrovich Viktorov, 1967.

*Primary Examiner*—Stafford D. Schreyer
*Attorney, Agent, or Firm*—McAndrews, Held & Malloy

[57] ABSTRACT

An acoustic touch position sensor is shown wherein a Lamb wave is imparted into a substrate by a transducer mounted on the substrate, the Lamb wave propagating along a first axis. Top and bottom reflecting arrays are disposed along the first axis to reflect portions of one mode of the Lamb wave along a plurality of parallel paths extending across a touch surface of the substrate to a second pair of top and bottom reflect arrays. The second pair of top and bottom reflecting arrays reflect the Lamb waves incident thereto along an axis parallel to the first axis to a receiving transducer that provides a signal representative of the received Lamb waves. A touch on the substrate results in a partial absorption of the energy in the Lamb wave propagating along a path intersection the touch position so as to produce a perturbation therein which is sensed to determine the axial position of the touch on the substrate. In a second embodiment a single transducer and reflective array is provided for each axis, a coordinate on which is to be determined. In a third embodiment of the present invention, a single transducer is provided for two axes.

80 Claims, 8 Drawing Sheets

Fig. 1A
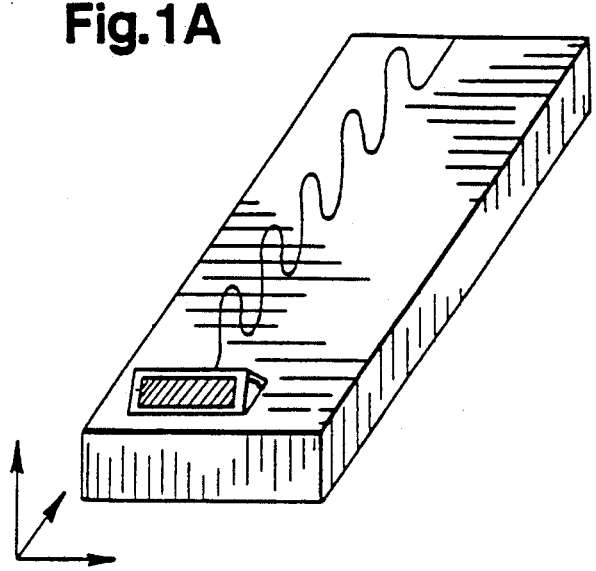
Fig. 1B
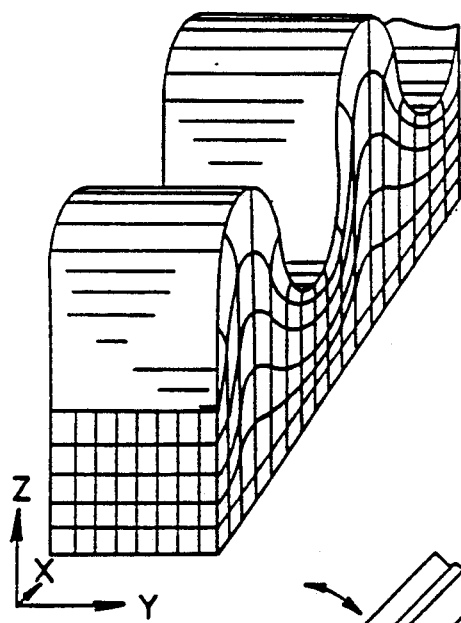
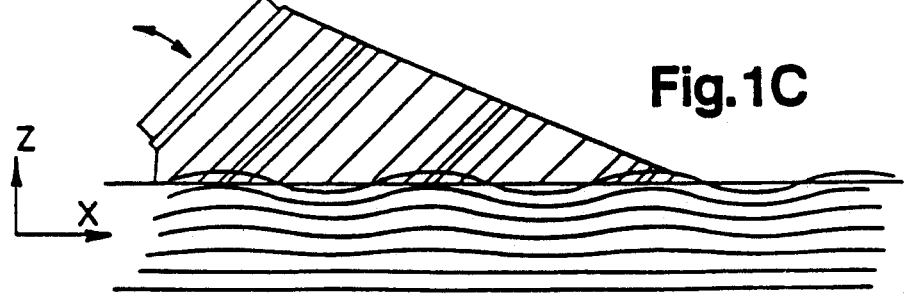
Fig. 1C

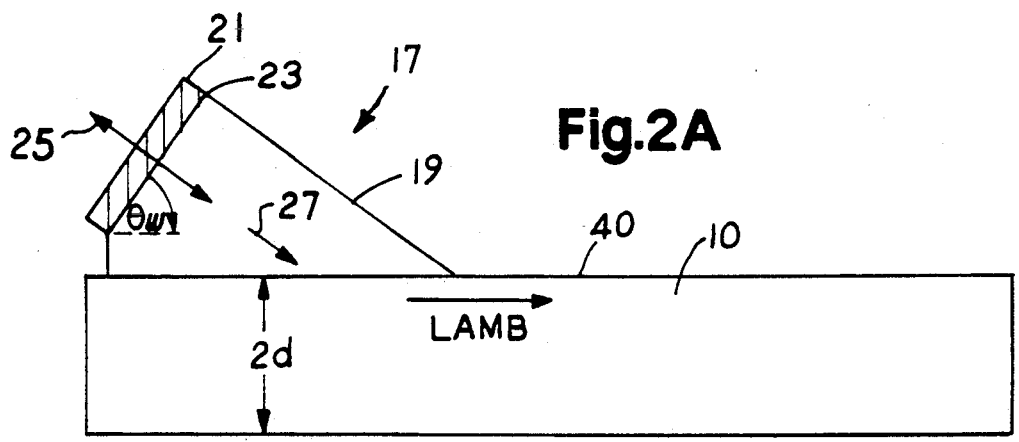
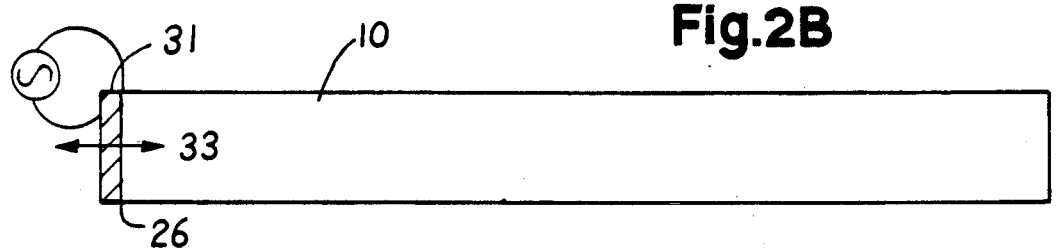
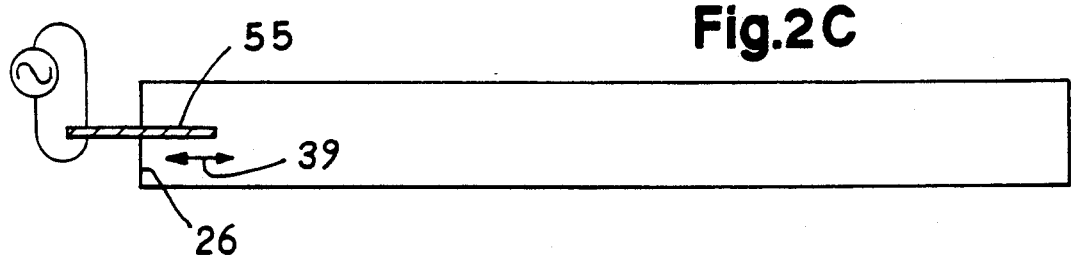
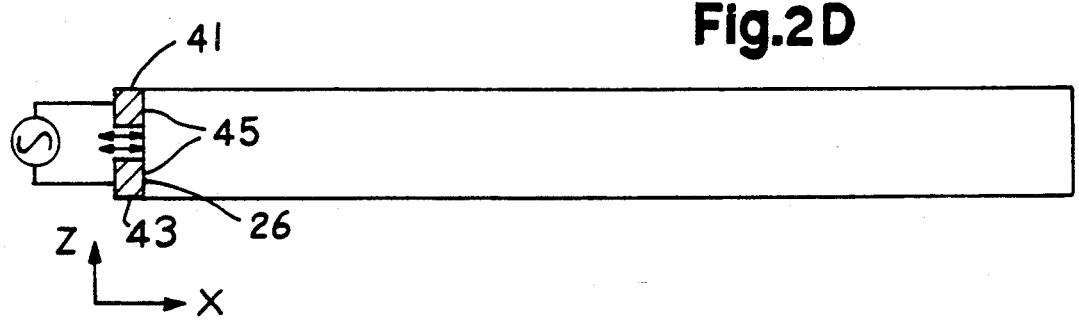

ACOUSTIC TOUCH POSITION SENSOR WITH FIRST ORDER LAMB WAVE REFLECTIVE ARRAYS

CROSS REFERENCE TO RELATED APPLICATION

This application is related to co-pending applications Ser. No. 07/614,494, now U.S. Pat. No. 5,072,427, and application Ser. No. 07/615,030, both filed Nov. 16, 1990 in the name of Terence J. Knowles.

TECHNICAL FIELD

The present invention relates to an acoustic touch position sensor and more particularly to such a sensor wherein a Lamb wave is imparted into a substrate, the Lamb wave propagating in the substrate along a plurality of paths of differing lengths wherein each path is associated with a different axial position on the substrate. A touch on the substrate results in a partial absorption of energy so as to produce a perturbation in a Lamb wave propagating along a path intersecting the position of the touch, the perturbation being sensed to determine the axial position of the touch on the substrate.

BACKGROUND OF THE INVENTION

Acoustic touch position sensors are known to include a touch plate and two or more transducers each of which imparts a surface acoustic wave that propagates along an axis on which a reflective grating is disposed to reflect portions of the surface acoustic wave along plural parallel paths of differing lengths. The reflective gratings associated with the respective transducers are disposed on perpendicular axes so as to provide a grid pattern to enable coordinates of a touch on the plate to be determined. Acoustic touch position sensors of this type are shown in U.S. Pat. Nos. 4,642,423, 4,644,100, 4,645,870, 4,700,176, 4,746,914 and 4,791,416.

Acoustic touch position sensors utilizing surface acoustic waves as taught by the above-mentioned patents have a number of problems which are more readily understood when the nature of the surface acoustic wave used in these sensors is considered. Surface acoustic waves are shown in FIGS. 1A–D propagating in the X direction. Surface acoustic waves have an X component and a Z component such that the particles of a surface acoustic wave move elliptically in the X, Z plane. Although surface acoustic waves have a Z component, the disturbance of particles in the plate created by a surface acoustic wave decays rapidly in the −Z direction so that the wave energy is essentially confined to the surface of the plate.

More precisely, waves in a uniform, non-piezoelectric medium of finite thickness that are confined to a single surface are termed quasi-Rayleigh waves, since true Rayleigh waves exist only in an infinitely thick propagating medium. A Rayleigh/quasi-Rayleigh wave is shown more particularly in FIG. 1D. In order to provide such a wave, the thickness of the touch plate must be at least three to four times the wavelength of the wave imparted into the substrate wherein the length of the touch plate is also limited. If the thickness of the touch plate is for example two wavelengths or less, Lamb waves will be generated in the touch plate instead of Rayleigh waves. Lamb waves are dispersive waves, varying in phase and group velocities. A touch plate in accordance with the teachings of the above-mentioned patents would not work in such a thin plate because Rayleigh or quasi-Rayleigh waves cannot exist therein. However, for a panel having a thickness that is at least three to four times the wavelength of the wave propagating therein, nearer the source of the wave, i.e. the transducer, the symmetric and anti-symmetric Lamb waves appear to be in phase. As seen in FIG. 1D, the symmetrical and anti-symmetrical Lamb waves 13 and 14 are not confined to a single surface of the touch plate but extend through the plate to the opposite surface thereof. When in phase, however, the symmetric and anti-symmetric Lamb waves add to produce a quasi-Rayleigh wave as can be seen from a comparison of FIGS. 1E and 1F to FIG. 1D. As the Lamb waves travel farther from the transducer, due to the differing phases and velocities of the Lamb waves, there is a complete transference of wave energy from the top surface of the touch plate on which the transducer is mounted, to the bottom surface of the touch plate. This transference of energy between top and bottom surfaces occurs at regularly spaced intervals making a touch plate having a dimension large enough for this transference of energy to occur unsuitable for a touch position sensor.

From the above it is seen that touch position sensors as shown in the above-mentioned patents utilizing surface acoustic waves and more particularly quasi-Rayleigh waves, as is necessary for the sensors to operate, are limited to relatively thick panels, i.e. panels having a thickness of three to four times the wavelength of the surface acoustic wave propagating therein. Although the wavelength of the propagating wave may be reduced by reducing the frequency of the drive signal applied to the transducer, as the wavelength of the wave is reduced, transference of energy between the top and bottom surfaces of the touch plate occurs closer to the transducer so as to limit the size of the touch plate.

Further, because surface acoustic waves are confined to the surface of the touch plate, contaminants or other materials abutting the plate may create shadows or blind spots extending along the axes of the plate that intersect the contaminant or abutting material. The blind spots or shadows are created by a total or near total absorption of the wave energy by the contaminant or abutting material so that the touch position sensor cannot detect a touch if one of its coordinates is on a blinded axis. Substantial losses in wave energy over time as a result of air damping of the surface acoustic wave is also significant since surface acoustic waves are confined to the surface of the touch plate. The energy losses due to air damping further limit the size of the touch plate.

Although acoustic waves other than surface acoustic wave can propagate in a solid such waves including Lamb waves and shear waves, heretofore these other acoustic waves were thought to be unsuitable for a touch position sensor. Lamb waves were thought unsuitable because they are dispersive, varying in phase and velocity, so as to interfere with one another. Shear waves were thought unsuitable because a touch on a plate in which shear waves are propagating absorbs only a small percentage of the total shear wave energy whereas a touch on a plate in which a surface acoustic wave is propagating absorbs a much greater percentage of the surface acoustic wave energy. More particularly, the percentage of total energy absorbed by a given touch is ten times greater for a surface acoustic wave than it is for a shear wave. Since shear waves are not nearly as responsive to touch as surface acoustic waves, shear waves were not thought practical for a touch position sensor.

SUMMARY OF THE INVENTION

In accordance with the present invention, the disadvantages of prior acoustic touch position sensors as discussed above have been overcome. The touch position sensor of the present invention includes means for imparting a Lamb wave into a substrate for propagation along the axis of a reflecting array that reflects portions of either symmetric mode Lamb waves or antisymmetric mode Lamb waves along a plurality of parallel paths of differing lengths, each path representing a different axial position. A touch on the substrate forms a perturbation in a Lamb wave propagating along a path intersecting the position of the touch, the time of occurrence of the perturbation being sensed to determine the axial position of the touch on the substrate.

The use of Lamb waves provides the touch position sensor of the present invention with several advantages. First, Lamb waves are very fractionally sensitive to touch. That is, the percentage of the total Lamb wave energy absorbed by a touch is similar to the percentage of the total Rayleigh/quasi-Rayleigh wave energy absorbed by a touch. However, unlike Rayleigh/quasi-Rayleigh waves, the Lamb waves utilized in the present invention may propagate in thin substrates. Virtually the only limit on the thinness of the touch plate of the present invention is its structural integrity making it extremely practical for applications where the weight of the touch sensor must be minimized.

The Lamb wave reflecting means of the present invention includes a first array of reflecting elements disposed on the substrate along a first axis perpendicular to the side of the substrate on which a transducer is bonded to impart a Lamb wave into the substrate. The reflecting elements of the first array reflect portions of the Lamb waves along the parallel paths that extend across the touch surface of the substrate. The reflecting means also includes a second array of reflecting elements that are disposed on a surface of the substrate that is opposite to the surface on which the first array of reflecting elements is disposed. The second array of reflecting elements is aligned with respect to the elements in the first array to suppress either the symmetric mode Lamb waves or the antisymmetric mode Lamb waves. Because one of the Lamb wave modes is suppressed, there is little or no interference with the other Lamb wave mode, making the Lamb waves suitable for a touch position sensor.

In order to suppress the antisymmetric mode, the elements of the second reflective array are aligned with the elements of the first reflective array. To suppress the symmetric mode Lamb waves, the second array of reflective elements are shifted relative to the first array of reflective elements by an amount that is approximately equal to the wavelength of a symmetric mode Lamb wave divided by two.

In order to determine the position of a touch along a second axis that is generally perpendicular to the first axis, a second reflecting means is provided for reflecting portions of a shear wave along second parallel paths extending across the touch surface of the substrate, each of these second paths representing a different axial position relative to the axis of the second reflecting means wherein the second axis is generally perpendicular to the axis of the first reflecting means. A touch on the substrate surface forms a perturbation in the Lamb waves propagating along a second path intersecting the position of the touch wherein the time of occurrence of the perturbation is determined to in turn determine the axial position of the touch on the substrate relative to the second axis.

In one embodiment of the present invention, two reflecting means are provided for each axis for which the position of a touch is to be determined relative to. More particularly, the first reflecting means extends along a first axis for reflecting portions of the Lamb wave along parallel paths extending across the surface of the substrate to the second reflecting means. The second reflecting means extends along an axis parallel to the first axis and reflects the Lamb waves incident thereto along the axis of the second reflecting means to a receiving transducer that is coupled to the same side of the substrate as the transmitting transducer. When the position of a touch relative to two axes is to be determined, with this embodiment four reflecting means are employed.

In another embodiment of the present invention only a single reflective means is required for each axis for which the position of a touch is to be determined relative to. More particularly, for each axis the reflecting means reflects a Lamb wave propagating along its axis along parallel paths extending across the touch surface of the substrate to a reflective edge of the substrate. The reflective substrate edge reflects the Lamb waves back along the first parallel paths to the reflecting means which reflects the reflected Lamb waves back along its axis to the transducer. The transducer in this embodiment functions not only as a transmitting transducer that imparts the Lamb wave into the substrate but also functions as a receiving transducer for sensing Lamb waves propagating thereto to provide a signal representative of the sensed Lamb waves to the touch position determining means. Further, one transducer to transmit and receive Lamb waves may be provided for each axis for which a touch coordinate is to be determined. Alternatively, a single transducer may be provided for transmitting and receiving a Lamb wave that propagates on two axes wherein a means is provided that intersects both axes for reflecting the Lamb wave propagating along the first axis of the first reflecting means to the second axis of the second reflecting means and visa versa.

These and other objects, advantages and novel features of the present invention, as well as details of an illustrated embodiment thereof, will be more fully understood from the following description and the drawing.

BRIEF DESCRIPTION OF THE DRAWING

FIG. 1A is a perspective view of a prior art surface acoustic wave propagating plate;

FIG. 1B is a greatly exaggerated perspective view of a surface acoustic wave traveling in the prior plate of FIG. 1A;

FIG. 1C is a side cross-sectional view of the prior art plate shown in FIG. 1A illustrating the nature of the waves generated in the plate;

FIG. 2A is a partial side view of a touch position sensor in accordance with the present invention utilizing a wedge transducer;

FIG. 2B is a partial side view of a touch position sensor in accordance with the present invention utilizing a compression transducer;

FIG. 2C is a partial side view of a touch position sensor in accordance with the present invention utilizing a length expander transducer;

FIG. 2D is a partial side view of a touch position sensor in accordance with the present invention utilizing a split compression transducer;

DETAILED DESCRIPTION OF THE PREFERRED EMBODIMENT

Figure 1D:
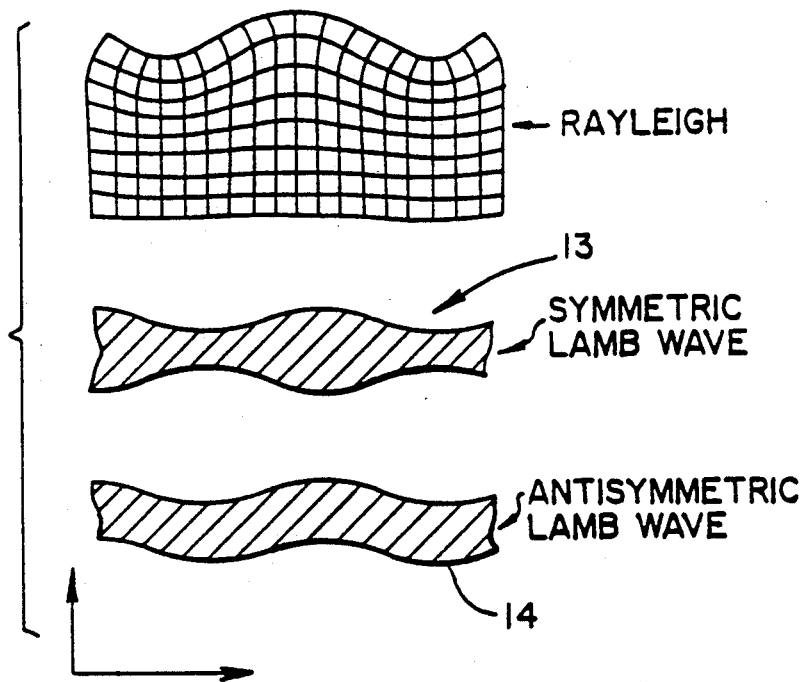
FIG. 1D is an illustration of a Rayleigh wave, a symmetric Lamb wave and an antisymmetric Lamb wave.

The touch position sensor of the present invention includes a substrate 10 that is capable of propagating a Lamb waves 13 and 14 as shown in FIG. 1D. The substrate 10 may be formed of tempered or frosted glass, plastic, metal or ceramic. The substrate 10 may further be formed as a flat plate as shown or the substrate may be curved.

A Lamb wave may be imparted into the substrate 10 utilizing a number of different transducers as depicted in FIGS. 2A-D. In a first embodiment of the present invention as shown in FIG. 2A, a wedge transducer 17 is employed, the wedge transducer 17 including an acrylic wedge mounted on a top surface 40 of the substrate 10 and a compressional piezoelectric transducer 21 that is bonded on to an end 23 of the acrylic wedge 19. The transducer 21 vibrates in the direction of the arrow 25 so as to impart a compressional wave traveling in the direction of the arrow 26 so as to impart a Lamb wave propagating along an X axis in the substrate 10. The wavelength of the Lamb wave imparted into the substrate 10 is approximately equal to two times the thickness of the substrate 10. The angle of the acrylic wedge $\theta_W$ is selected so as to be equal to the arcsine of the phase velocity of the compressional wave traveling in the wedge 19 divided by the phase velocity of the Lamb wave propagating in the substrate 10. The wedge transducer 17 is tuneable to impart either a symmetric Lamb wave into the substrate 10 or to impart an antisymmetric Lamb wave into the substrate 10.

In a second embodiment, as shown in FIG. 2B, a compressional piezoelectric transducer 31 is bonded on to a side of the substrate 10. The transducer 31 is responsive to a drive signal to vibrate in the direction of the arrows 33 so as to impart a symmetric Lamb wave into the substrate 10 for propagating along an X axis. In the embodiment of the present invention depicted in FIG. 2C, a symmetric Lamb wave is also imparted into the substrate 10 by a length expander transducer 55 that vibrates in the direction of the arrows 39 so as to impart a symmetric Lamb wave propagating along the X axis.

An antisymmetric Lamb wave generator is depicted in FIG. 2D wherein the antisymmetric Lamb wave generator includes a pair of compressional piezoelectric transducers 41 and 43 that propagate in the direction of the arrows 45. The transducers 41 and 43 are driven by complimentary sine waves so as to impart an antisymmetric Lamb wave into the substrate 10 for propagation along the X axis.

Figure 3:
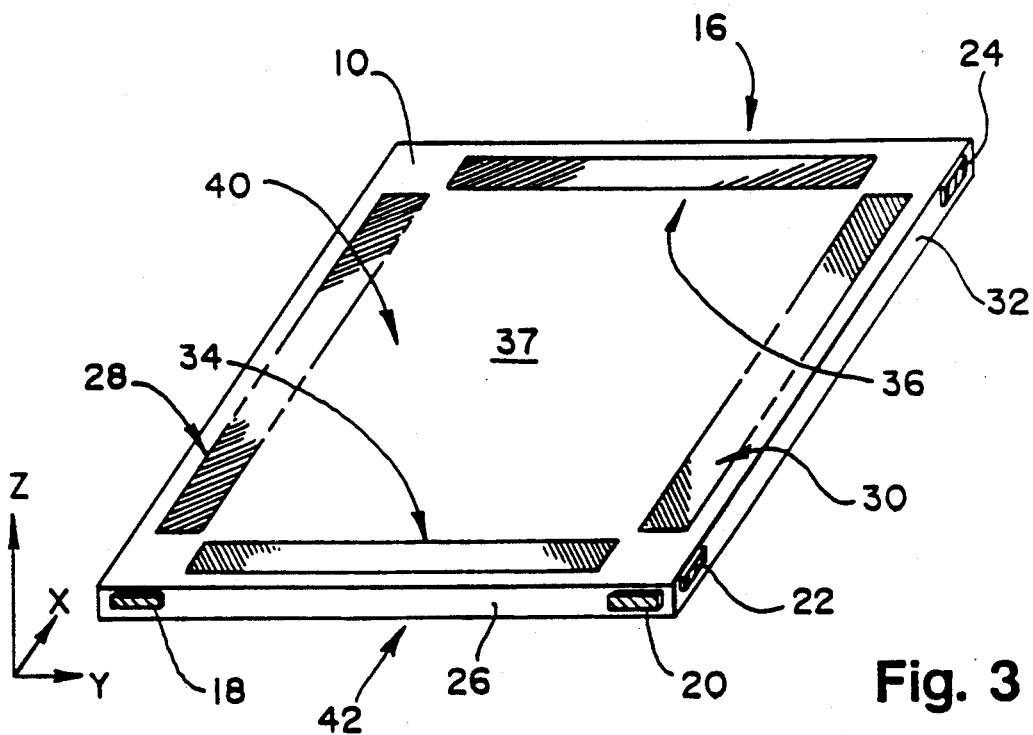
FIG. 3 is a perspective view of an acoustic touch position sensor in accordance with a first embodiment of the present invention.

A touch position sensor 16 in accordance with a first embodiment of the present invention is shown in FIG. 3 having a pair of transmitting and receiving transducers 18, 20 and 22, 24 associated with each axis for which a coordinate is desired to be determined. Although the touch position sensor 16 has four transducers 18, 20 and 22, 24 respectively associated with the X axis and Y axis so that both X and Y coordinates of a touch may be determined, if only a single coordinate is desired, for example a coordinate along the X axis, then the transducers 22 and 24 associated with the Y axis may be eliminated. As shown in FIG. 3, the transducer 18, 20, 22 and 24 are formed of compressional transducers as shown in FIG. 2B; however, any of the transducer as depicted in FIGS. 2A, 2C and 2D may be employed instead. The piezoelectric transducers 18, 20, 22 and 24 are bonded on to the sides 26 and 32 of the substrate 10 by means of a conductive frit. The conductive frit forms a contact that may extend around the corner of the substrate 10 between the transducers 20 and 22 to eliminate the need for separate ground wires connected to these two adjacent transducers.

In order to define the X axis, the X transmitting transducer 18 vibrates along the X axis to impart a symmetric Lamb wave into the substrate, the Lamb wave traveling along the X axis to a reflecting array 28 formed on the top surface 42 of the substrate 10. The reflecting array is such as to reflect portions of the symmetric Lamb wave 13 along a plurality of paths that extend across the touch surface 37 of the substrate perpendicular to the axis of the array 28 to a second reflecting array 30 wherein each of the parallel paths extending in the Y direction represent a different axial position with respect to the X axis as discussed below. The reflecting array 30 reflects Lamb waves propagating in a direction perpendicular to the array 30 along the axis of the array 30 to the receiving transducer 20 mounted on the side 26 of the substrate. The receiving transducer is responsive to symmetric Lamb waves propagating thereto along the axis of the array 30 to generate a signal representative thereof as discussed below.

Similarly, in order to define the Y axis, the Y transmitting transducer 22 vibrates along the Y axis to impart a symmetric Lamb wave that travels along the Y axis to a pair of top and bottom Lamb reflecting array 34 that is formed on the top surface 42 of the substrate 10. The top and bottom reflecting array is such as to reflect portions of the symmetric Lamb waves along a plurality of parallel paths that extend across the touch surface 37 of the substrate perpendicular of the axis of the array 34 to a reflecting array 36. Each of the parallel paths extending across the touch surface of the substrate in the X direction represent a different axial position with respect to the Y axis as discussed below. The reflecting array 36 reflects the Lamb waves propagating incident thereto along the axis of the array 36 to the receiving transducer 24 mounted on the side 32 of the substrate 10.

Because Lamb waves are dispersive, the phase velocities of the Lamb waves vary with frequency, thickness of the substrate and the particular mode of interest. For plate thicknesses and Lamb wavelengths of practical significance, only first order symmetric and antisymmetric Lamb waves are excited in the substrate 10. These first order mode Lamb waves have the characteristic that their energy distribution along an axis at right angles to the plane of the substrate is similar to that of a surface acoustic wave and therefore, these first order Lamb waves have a fractional sensitivity to touch that is also similar to surface acoustical waves. Because the phase and group velocities of the first order antisymmetric and symmetric Lamb waves differ from each, however, other undesirable effects can occur if one of the Lamb wave modes is not suppressed by the reflecting arrays 28, 30, 34 and 36. For example, interference between the first order antisymmetric and symmetric Lamb waves causes excessive variation in the output response. Further, when both modes are present, wave energy exits the transmitting arrays 28 and 34 at undesired angles as well as the desired angle. This causes the output signal of the sensor to exhibit multiple and excessive dips in response to touch so that the location of a touch cannot be determined. Although the transducers 18, 20, 22 and 24 may be selected to impart Lamb waves of only one mode type into the substrate a discussed above with respect to FIGS. 2A-D, the reflective arrays 28, 30, 34 and 36 tend to generate the other mode as well. In order to suppress one of the Lamb wave modes at the reflectors, reflective arrays 29, 47, 35, and 49 are positioned on the bottom surface 42 of the substrate 10 and are aligned with respect to their respective top arrays 28, 30, 34 and 36 so as to reject the undesired Lamb wave mode.

Figure 4:
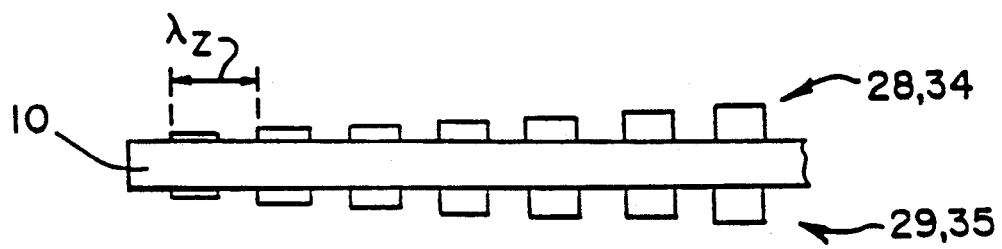
FIG. 4 is a partial side view of the sensor shown in FIG. 3 illustrating an aligned bottom array to suppress antisymmetric Lamb waves.

More particularly, the antisymmetric Lamb wave mode can be cancelled or suppressed, reinforcing the symmetric Lamb wave mode aligning the reflecting elements of the bottom arrays 29, 47, 35 and 49 directly below the elements of the respective the reflecting top arrays 28, 30, 34 and 36 as shown in FIG. 4. In order to suppress the symmetric Lamb wave mode and reinforce the antisymmetric Lamb wave mode, the elements of the bottom arrays 29, 47, 35 and 49 are displaced from the elements of the respective top arrays 28, 30, 34 and 35 by the wavelength of the first order antisymmetric Lamb wave divided by two i.e. $\lambda_{1aL}/2$. This latter embodiment is depicted in FIG. 5.

The reflective top and bottom arrays 28, 30, 34, 36, 29, 35, 47 and 49 may be formed of metal and bonded on to the respective top and bottom surfaces 40 and 42 of the substrate 10. However, in the preferred embodiment of the present invention, the reflective arrays are formed by silk screening frits on the top and bottom surfaces 40 and 42 of the substrate 10. The reflective array frits may be formed during the same cycle as the conductive frits used to bond the transducers to the substrate 10. Each of the reflective elements of the arrays 28, 30, 34 and 36 is disposed at a 45° angle with respect to its axis so as to reflect portions of the Lamb wave incident thereto in a direction perpendicular to the array's axis. Preferably, the spacing between adjacent reflective elements is equal to one wavelength of the wave imparted into the substrate 10 by the respective transducer. The width of each reflective array 18, 20, 22 and 24 is equal to the width of the transducer where the drive signal applied to the transducer is a sine wave, the number of cycles of which is equal to the array width divided by a constant.

Figure 5:
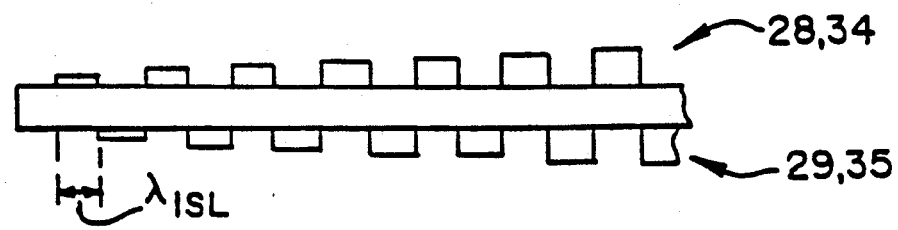
FIG. 5 is a partial side view of the sensor shown in FIG. 3 illustrating a shifted bottom array to suppress symmetric Lamb waves.
Figure 6:
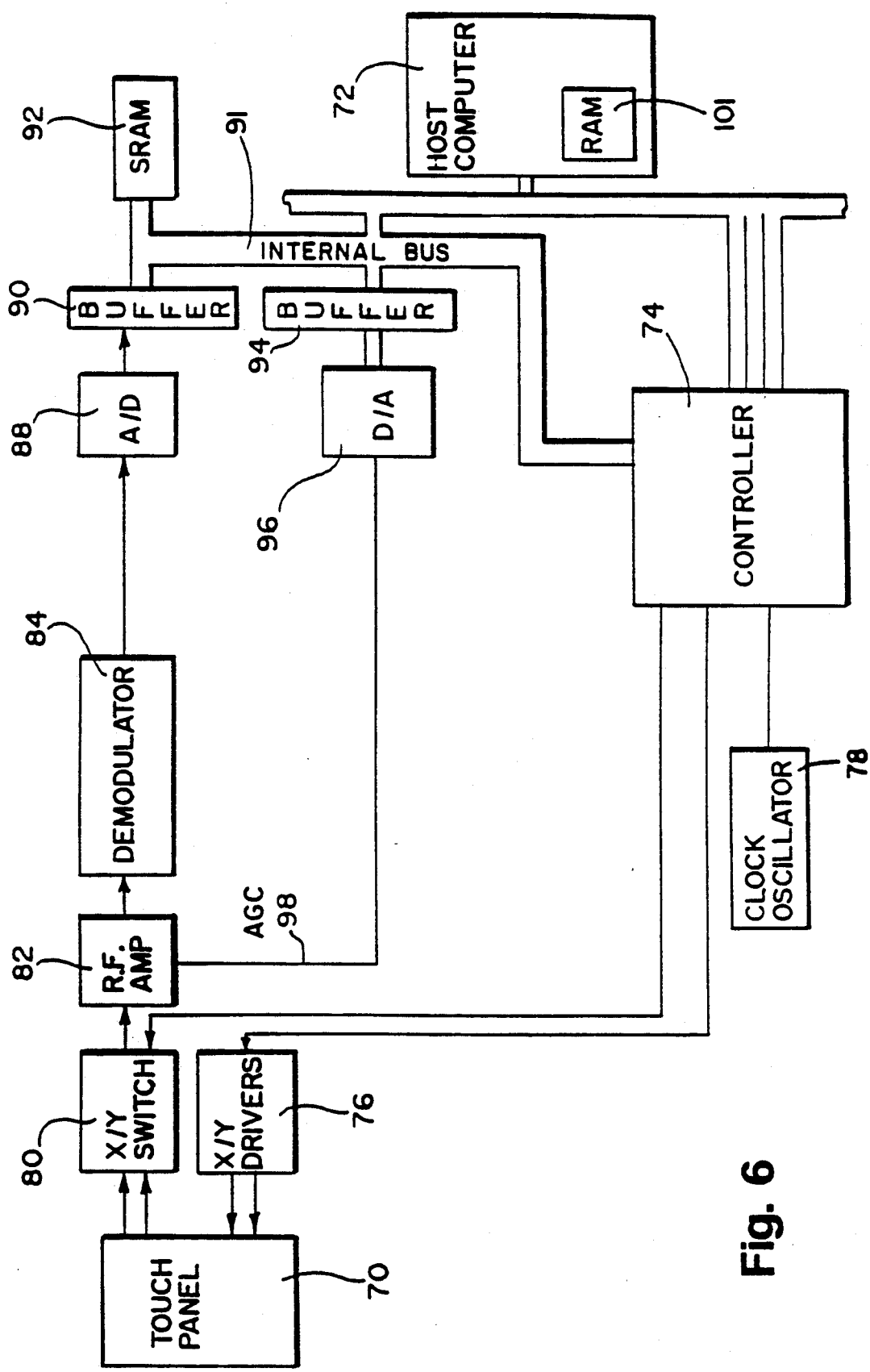
FIG. 6 is a block diagram illustrating the signal processing portion of the touch position sensor illustrated in FIG. 3.

In accordance with the preferred embodiment of the present invention, the technique employed to increase the power reflectivity at points along the array as the distance of the points along the array from the respective transducer increases employs a variable height reflective array as shown in FIGS. 4 and 5. The height of each element in the reflective array is such that the power reflectivity per unit length of a reflective array, $\sigma(x)$ is given by $$\sigma(x) = \frac{\alpha}{(1 + \alpha/\sigma_L)\epsilon^{\alpha(L-x)} - 1}; \quad \text{eq. 1}$$

the ratio of the height of the array at x to the height of the first array element (x=o) is $$\frac{h(x)}{h(o)} = \left[\frac{(1 + \alpha/\sigma_L)\epsilon^{\alpha L} - 1}{(1 + \alpha/\sigma_L)\epsilon^{\alpha(L-x)} - 1}\right]^{\frac{1}{2}}; \quad \text{eq. 2}$$

and the ratio of the heights of the last array element and the first array element is $$\frac{h(L)}{h(o)} = \left[\frac{(1 + \alpha/\sigma_L)\epsilon^{\alpha L} - 1}{\alpha/\sigma_L}\right]^{\frac{1}{2}};$$

where $\alpha$ represents the power absorbtivity of the array per unit length, x is a variable representing the distance from the start of the array and L represents the length of the array. To design a variable height array, a practical value for the ratio of the maximum to minimum height, h(L)/h(o), is determined and substituted into equation 4 to determine $\sigma_L$. Thereafter the values of h(o) and $\sigma_L$ are substituted into equation 3 to determine the height of the array as a function of distance. With variable height arrays, the waveforms shown in FIG. 6 are obtainable wherein the amplitude of the Lamb waves propagated by the reflecting array elements is maintained substantially constant across the array in the absence of a touch.

The elements in the reflecting arrays 28, 29, 30 and 47 define a number of paths of differing lengths such that Lamb weaves reflected by each successive element in the array 28, 29 follow paths to the receiving transducer 20 that are progressively longer. Portions of each of the paths defined by the reflective arrays 28 and 30 extend in parallel across the substrate 10 in the Y direction, each parallel path portion defining an X coordinate. Similarly, the elements in the reflecting arrays 34, and 36 define a number of paths of differing lengths such that Lamb waves reflected by each successive element in the array 34 follow paths to the receiver 24 that are progressively longer. Portions of each of the paths defined by the arrays 34 and 36 extend in parallel across the substrate 10 in the X direction, each parallel path portion defining a Y coordinate.

Figure 9:
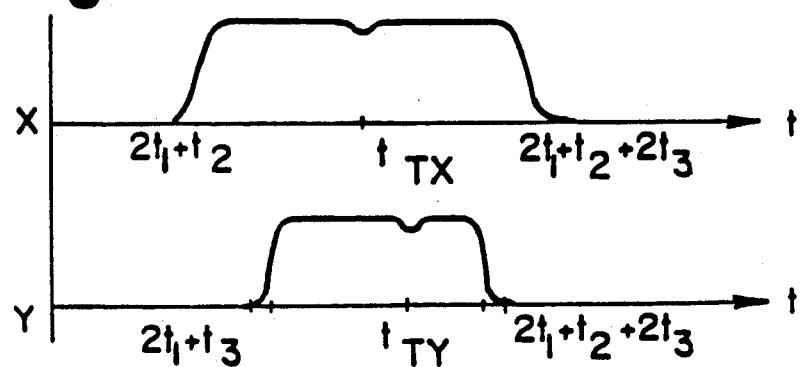
FIG. 9 is a graph illustrating the X and Y wave forms generated by the touch position sensor of FIG. 3.

The X and Y signals generated by the respective receiving transducers 20 and 24 are depicted in FIG. 9 wherein reflective arrays of variable height are employed to provide X and Y signals whose amplitudes remain substantially constant with time as discussed above. With regard to the X axis signal, if a Lamb wave is generated by the transducer 20 beginning at time $t_0$, the first Lamb wave received by the transducer 20 occurs at a time equal to $2t_1+t_2$ where $t_1$ is the time it takes a Lamb wave to travel from the substrate side 26 to the first element in the reflecting array 28, 29 and also the time that it takes the Lamb wave to travel from the first element in the reflecting array 30, 47 to the side 26 where it is sensed by the transducer 20. In the equation, $t_2$ represents the time it takes a Lamb wave to travel across the substrate 10 in the Y direction. The Lamb wave portion reflected by the last element in the reflecting array 28, 29 and received by the last element in the reflecting array 30, 47 is received by the transducer 20 at a time equal to the $2t_1+t_2+2t_3$ wherein $t_3$ represents the time it takes a Lamb wave to travel in the X direction between the first element of the reflecting array 28, 29 and the last element of the reflecting array 28, 29 as well as the time it takes a Lamb wave to travel in the X direction between the last element of the reflecting array 30 and the first element thereof. Similarly, if the transducer 22 generates a Lamb wave at time $t_0$, the receiving transducer 24 receives the first Lamb wave reflected by the arrays 34 and 36 at a time $2t_1+t_3$ and the receiving transducer 24 receives the last Lamb wave reflected by the arrays 34, 36 at time $2t_1+t_3+2t_2$. Each value of $t_x$ between $2t_1+t_2$ and $2t_1+t_2+2t_3$ represents a coordinate along the X axis; whereas, each value of $t_y$ between $2t_1+t_3$ and $2t_1+t_3+2t_2$ represents a coordinate along the Y axis. It is noted that in the preferred embodiment the time at which the drive signal is applied to the Y axis transmitting transducer 22 is at a time subsequent to the application of the drive signal to the X axis transmitting transducer 18 and also subsequent to the time that the X axis receiving transducer 20 receives the last Lamb wave reflected by the arrays 28 and 30.

Figure 8:
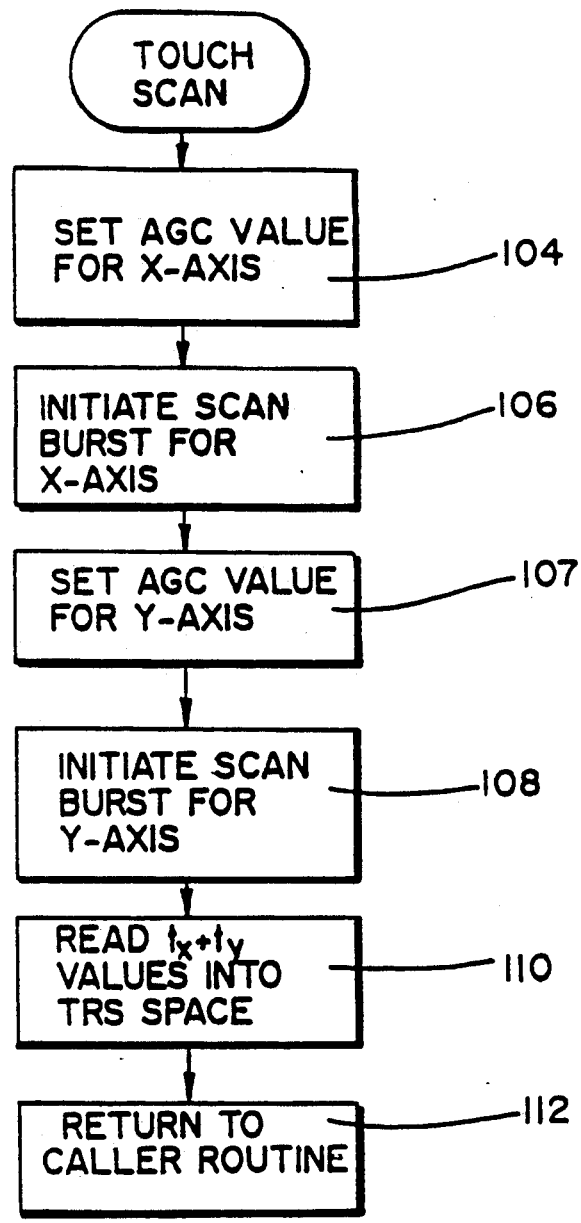
FIG. 8 is a flow chart illustrating the touch scan routine called by the software routine illustrated in FIG. 6.

A touch on the touch surface 37 of the substrate 10 will absorb a portion of the energy in the Lamb waves passing underneath or above the touched position. This partial absorption of energy creates a perturbation in the Lamb wave whose energy is absorbed, the perturbation being reflected in the amplitude of the signals generated by the receiving transducers 20 and 24. For example, the coordinates of a touch on the touch surface 37 of the substrate 10 are represented by the times of occurrence of the perturbations in the X and Y transducer signals depicted respectively at $t_{Tx}$, $t_{Ty}$ in FIG. 8.

The control system of the touch position sensor as shown in FIG. 5 controls the application of the drive signals to the transducers 18 and 22 and determines the coordinates of a touch on the substrate 10 from the times of occurrence $t_{Tx}$ and $t_{Ty}$ of the signal perturbations representing the touch. The touch panel 70 as shown in FIG. 5 is comprised of the substrate 10, the X and Y transmitting transducers 18 and 20, the X and Y receiving transducers 20 and 24 and the reflecting arrays 28, 29, 30, 34, 35, 36, 47 and 49. A host computer 72 that may include a microprocessor or the like initiates a scan cycle of the touch panel 70 by instructing a controller 74. The controller 74 is responsive to an initiate scan cycle instruction from the computer 72 to apply a drive signal to the X transmitting transducer 18 through an X driver 76 wherein the timing of the controller 74 is determined by a clock/oscillator 78. The drive signal applied to the transducer 18 is a burst drive signal in the form of a sine wave the number of cycles of which is equal to the width of the array 28 divided by a constant. The controller 74 also sets an X/Y switch 80 to the X position to couple the X receiving transmitter 20 to an R.F. amplifier 82. As the Lamb waves reflected by the arrays 28 and 30 are sensed by the transducer 20, the transducer 20 generates an X axis signal representative thereof that is coupled to the amplifier 82 through the switch 80. The amplified X axis signal output from the amplifier 82 is applied to a demodulator 84 that removes the burst drive signal from the amplified X axis signal to provide an envelope waveform such as depicted in FIG. 9. The output of the demodulator 84 is coupled to an analogue to digital converter 88 the output of which is coupled by a buffer 90 to an internal bus 91. The controller 74 stores the digital data output from the analogue to digital converter 88 in a static RAM 92 such that a value representing the amplitude of the X axis signal at each point in time $t_x$ as sampled by the analogue to digital converter 88 is stored in a location in the static RAM 92 representing the point in time. After the X axis data is stored in the static RAM 92, the controller 74 controls the Y driver 76 to apply a burst drive signal to the Y axis transmitting transducer 22 of the touch panel 70. The controller 74 also changes the state of the X/Y switch 80 so that the Y receiving transducer 24 is coupled to the R.F. amplifier 82. The digital data representing the Y axis signal as output from the analogue to digital converter 88 is likewise stored in the static RAM 92 such that a value representing the amplitude of the Y axis signal at each point in time $t_y$ as sampled by the analogue to digital converter 88 is stored in a location in the static RAM representing the point in time.

Figure 7:
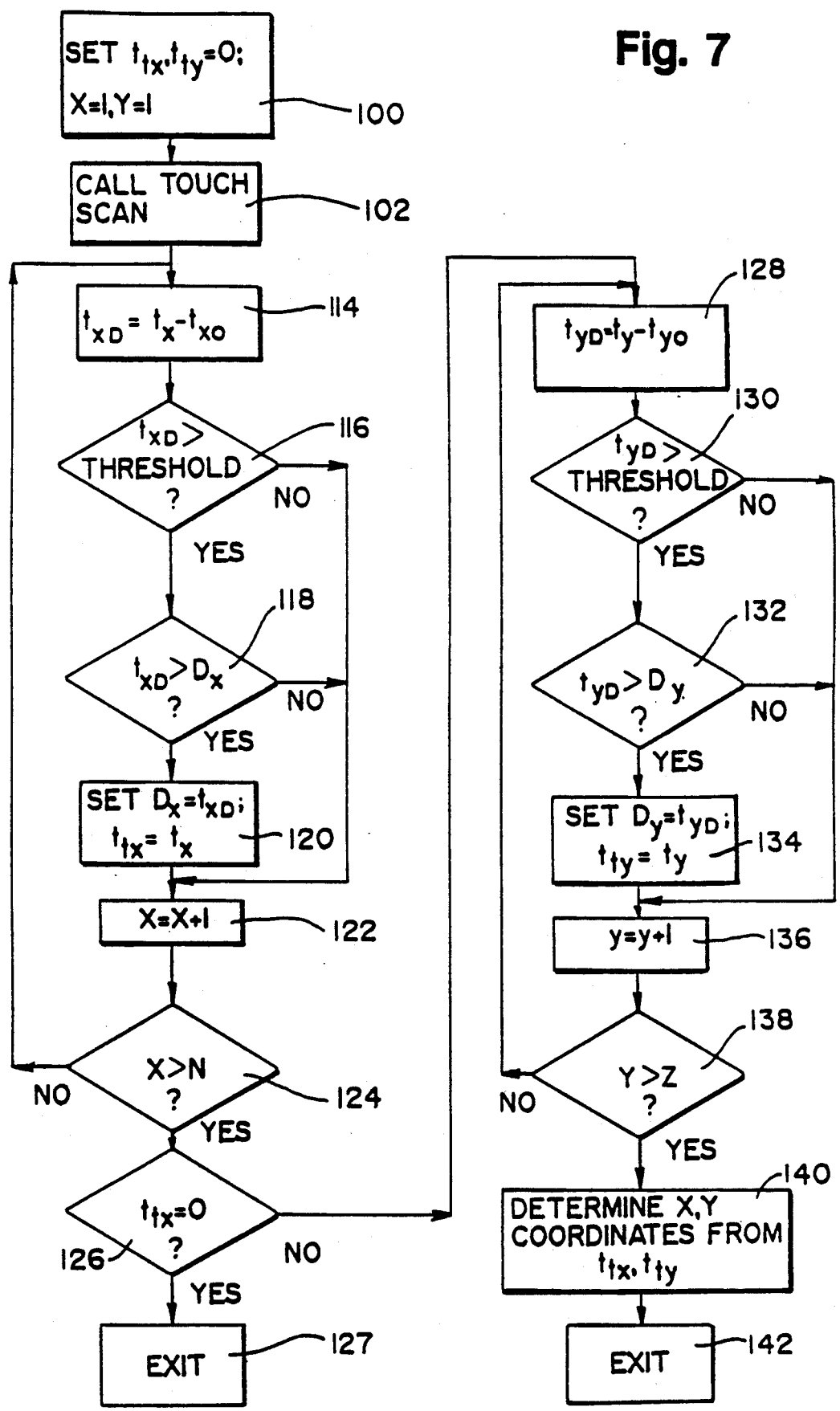
FIG. 7 is a flow chart illustrating the position determining operation of the sensor of the present invention.

The operation of the host computer 72 in determining the position of a touch on the touch panel 70 is illustrated in FIG. 6. During the initialization of the system, a scan cycle is performed for an untouched panel 70 with the X and Y amplitude values for times $t_{xo}$ and $t_{yo}$ stored in the static RAM 92. Thereafter, the X and Y amplitude values for each sampled point in time $t_{xo}$ and $t_{yo}$ are read out from the static RAM 92 and stored in a RAM 101 of the host computer 72. During an initialization process, the host computer 22 is responsive to the values stored in the RAM 101 for an untouched panel 70 at times $t_{xo}$ and $t_{yo}$, to set the gain on the R.F. amplifier 82 via a buffer 94 the output of which is coupled to a digital to analogue converter 96. After the initialization is performed, at a block 100 the host computer 72 sets the values of $t_{tx}$ and $t_{ty}$ equal to zero and the variables X and Y equal to 1. Thereafter, at block 102, the computer 72 calls a touch scan routine as shown in FIG. 7. The touch scan routine is a terminate and stay resident routine that is stored in the RAM 101 of the host computer 72. The host computer 72 in accordance with the touch scan routine at a block 104 sets the automatic gain control value for the R.F. amplifier 82 for the X axis to the value determined upon initialization. Thereafter, at block 106 the host computer 72 initiates a scan burst for the X axis by instructing the controller 74. After the X axis amplitude values are stored in the static RAM 92 for each sampled time $t_x$, the computer 72 at a block 107 sets the automatic gain control value for the Y channel and at block 108 instructs the controller 74 to initiate a scan for the Y axis. After the Y axis amplitude values are stored in the static RAM 92 for each sampled time $t_y$, the computer 72 at block 110 reads each of the amplitude values stored in the static RAM 92 for each sampled time $t_x$ and $t_y$ into a terminate and stay resident area of the RAM 101. Thereafter at block 112, the computer 72 returns to the routine depicted in FIG. 6.

After the X and Y axis values for times $t_x$ and $t_y$ are read from the static RAM 92 into the RAM 101 of the host computer, the host computer 72 at block 114 determines a difference value $t_{xD}$ from the difference between the amplitude value stored for time $t_x$ wherein x was initialized to 1 at block 100 and the value stored for $t_{xo}$, i.e. for x=1, where $At_{10}$ represents the amplitude value stored for the first sampled time during the initialization routine. Thereafter, at block 116 the computer determines whether the difference value $t_{xD}$ is greater than a threshold value and if it is, the computer 72 at block 118 determines whether the difference value $t_{xD}$ is greater than $D_x$ which represents the greatest difference value detected for the X axis. If $t_{xD}$ is greater than $D_x$ the computer 72 at block 120 sets $D_X$ equal to the difference value $t_{xD}$ and sets the time of occurrence $t_{tx}$ of the difference value equal to $t_x$. At block 122 the computer 72 increments x by one and if x is not greater than N, the number of sampled time points for the X axis, as determined by the computer 72 at block 124, the computer 72 returns to block 114 to determine the next difference value. After difference values are determined at block 114 for each point in time sampled by the analogue to digital converter 88 and for which amplitude values are stored in the RAM 101, the computer 72 at block 126 determines whether $t_{tx}$, the time of occurrence of the greatest amplitude difference $D_x$, is equal to zero or not. If $t_{tx}$ is equal to zero indicating that no touch is detected on the X axis, the computer 72 exits the routine at a block 127. If however, the value of $t_{tx}$ is not equal to zero indicating a touch the time of occurrence of which is equal to $t_{tx}$, the computer 72 goes to block 128. At block 128, the computer 72 compares the amplitude stored for times $t_y$ to the initialization value stored for the corresponding point in time $t_{y0}$ and stores the difference there-between as $t_{yD}$. At block 130, the computer 72 compares $t_{yD}$ to a threshold and if $t_{yD}$ is greater than the threshold the computer 72 at block 132 compares $t_{yD}$ to $D_y$, the value of the greatest difference calculated at block 128 for the Y axis signal. Thereafter, at block 134 if $t_{yD}$ was determined to be greater than $D_y$ at block 132, the computer 72 at block 134 sets $D_y$ equal to $t_{yD}$ and the time of occurrence $t_{ty}$ of the greatest difference signal $D_y$ equal to $t_y$. At block 136 the computer 72 increments the variable y by one and at block 138 compares y to the number Z of sample points for the Y axis signal. If y is less than or equal to Z the computer 72 returns to block 128. If y is greater than Z indicating that a difference signal has been calculated for each sampled point on the Y axis, the computer 72 at block 140 determines the X and Y coordinates of a touch from the values of $t_{tx}$ and $t_{ty}$. Thereafter at block 142 the computer 72 exits the routine.

Figure 10:
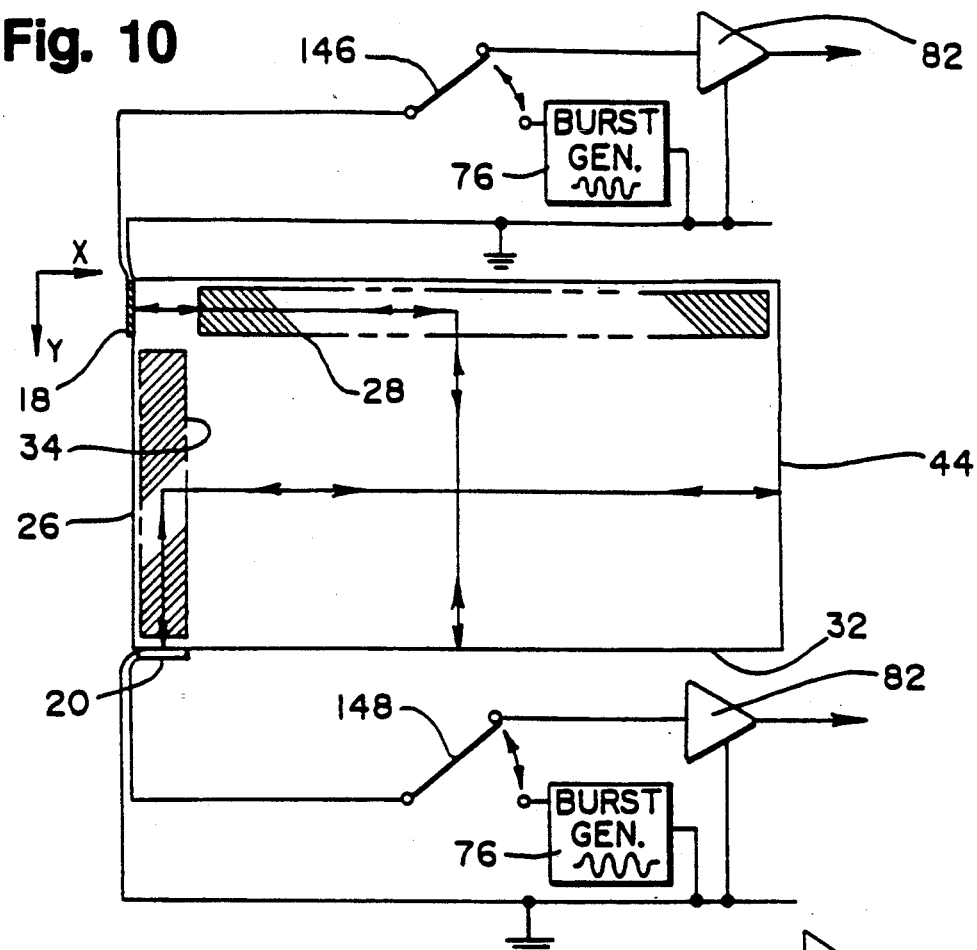
FIG. 10 is a top view of a second embodiment of the touch position sensor in accordance with the present invention.

A second embodiment of the touch position sensor of the present invention is shown in FIG. 10 and includes a single transducer for transmitting and receiving the Lamb waves associated with each axis, the coordinates of a touch on which is to be determined. Further, instead of having two reflecting means 28, 29 and 30, 47 for the X axis and two reflecting means 34, 35 and 36, 49 for the Y axis as the embodiment depicted in FIG. 3, the touch position sensor shown in FIG. 10 includes a single reflecting means 28–29, 34–35 for each axis wherein the side 32, 44 of the substrate 10 opposite to each array 28, 34 is machined to provide a reflective edge. The reflective edge 32, 44 of the substrate 10 reflects the Lamb waves propagating perpendicular thereto without any appreciable loss in energy.

More particularly, the transducer 18 is coupled to a transmit/receive switch 146 that is controlled by the controller 74 to couple the X driver 76 or burst generator to the transducer 18 during a first time period to apply the drive signal thereto. The transducer 18 is responsive to the drive signal to impart a Lamb wave into the substrate 10 that propagates along the axis of the array 28, 29. The reflective elements of the array 28, 29 reflect portions of the Lamb wave incident thereto along a plurality of parallel paths across the substrate 10 in the Y direction to the reflective edge 32 of the substrate 10. The substrate edge 32 reflects the Lamb waves propagating perpendicular thereto back along the parallel paths to the array 28, 29 which reflects the reflected Lamb waves along the array's axis back to the transducer 18. After the drive signal is applied to the transducer 18, the controller changes the state of the transmit/receive switch 146 to the receive position wherein the transducer 18 is coupled to the R.F. amplifier 82 so that Lamb waves sensed by the transducer are coupled to the position detection circuitry.

Similarly, the transducer 20 is coupled to a transmit/receive switch 148 that is controlled by the controller 74 to couple the Y driver 76 to the transducer 20 during a second time period to apply the drive signal thereto. The transducer 20 is responsive to the drive signal to impart a Lamb wave into the substrate 10 that propagates along the axis of the array 34, 35. The elements of the reflecting array 34, 35 reflect portions of the Lamb wave incident thereto along a plurality of parallel paths across the substrate 10 in the X direction to the reflective edge 44 of the substrate 10. The substrate edge 44 reflects the Lamb waves propagating perpendicular thereto back along the parallel paths to the reflective array 34, 35 which in turn reflects the reflected Lamb waves back to the transducer 20. After the drive signal is applied to the transducer 20, the controller changes the state of the transmit/receive switch 148 to the receive position wherein the transducer 20 is coupled to the R.F. amplifier 82 so that Lamb waves sensed by the transducer are coupled to the position detection circuitry.

Figure 11:
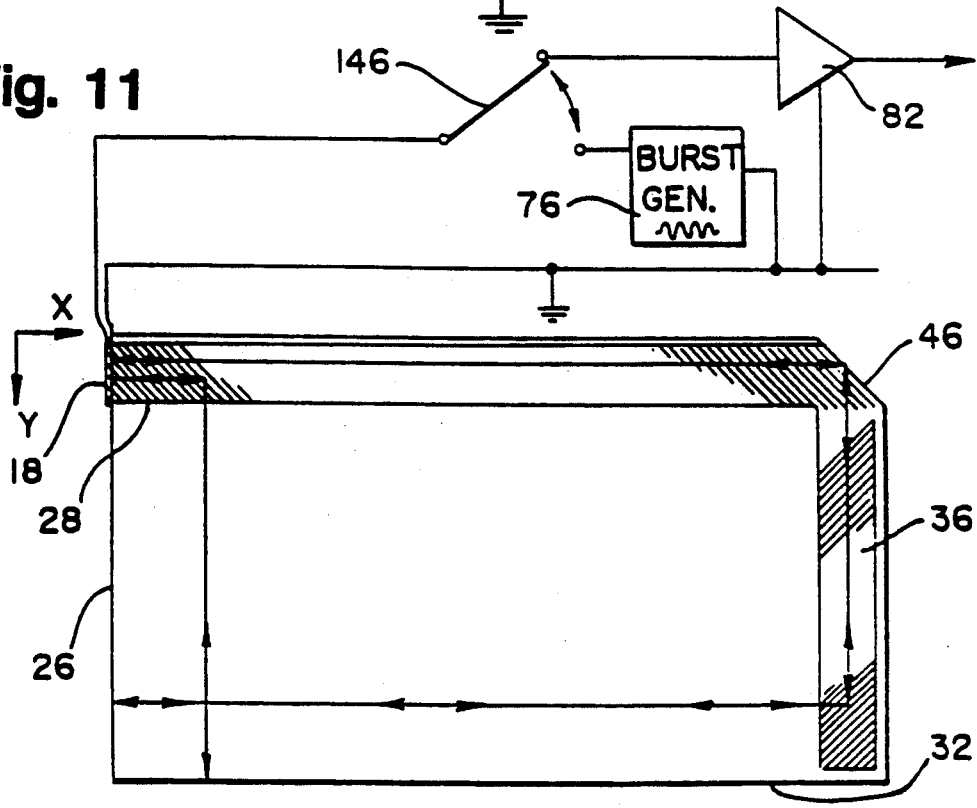
FIG. 11 is a top view of a third embodiment of the touch position sensor of the present invention.

A third embodiment of the touch position sensor of the present invention is shown in FIG. 11 and includes a single transducer for transmitting and receiving the shear waves associated with two perpendicular axes the coordinates of a touch on which are to be determined. In this embodiment, two reflecting arrays 28, 29 and 34, 35 are employed, a first reflective array 28, 29 extending along an axis perpendicular to the side 26 on which transducer 18 is mounted and a second reflective array 34, 35 extending along an axis perpendicular to the axis of the first array 28, 29 and adjacent to the end of the array 28, 29. In order to couple a Lamb wave propagating along the axis of the reflecting array 28, 29 to the reflecting array 34, 35, the corner of the substrate 10 intersecting the axes of the arrays 28, 29 and 34, 35 is cut in order to provide a reflective edge 46 that is disposed at a 45° angle with respect to the adjacent sides 44 and 48 of the substrate 10. In response to a drive signal from the driver 76, the transducer 18 imparts a Lamb wave into the substrate 10 that propagates along the axis of the array 28, 29. The elements of the array 28, 29 reflect portions of the Lamb wave to Lamb waves that propagates along a plurality of paths parallel to the Y axis to the side 32 of the substrate 10 wherein the side 32 is machined to provide a reflective edge. The side 32 of the substrate 10 reflects the Lamb waves propagating perpendicular thereto back to the array 28, 29 which in turn reflects the reflected Lamb waves back to the transducer 18. When the Lamb wave propagating along the axis of the reflective array 28 meets the reflective edge 46, the edge 46 reflects the Lamb wave along the axis of the second array 36, 49. The elements of the second array 36, 49 reflect portions of the Lamb wave along parallel paths across the substrate in the −X direction to the opposite side 26 of the substrate 10 which is machined to provide a second reflective edge. The substrate side 26 reflects the Lamb waves propagating perpendicular thereto back to the second reflective array 36, 49 which in turn reflects the Lamb waves to the reflective edge 46. The reflective edge 46 then reflects the Lamb waves back to the transducer 18. The transducer 18 senses the Lamb waves reflected back and provides a signal representative thereof. This mode of operation is designated the triple transit mode. It is noted, that in the preferred embodiment the transducer 18 is positioned on the side of the substrate 10 that is perpendicular to the axis of the longest reflective array so that there are no overlapping path lengths associated with the X array and the Y array.

Lamb wave touch position sensors are advantageous because the substrate 10 may be as thin as desired with Lamb waves having a low phase velocity. The low phase velocity, although reducing fractional sensitivity of the sensor, increases the dynamic range thereof and provides improved performance with respect to contaminants over prior surface acoustic wave sensors. Further, since the difference in phase velocity between the first order antisymmetric and symmetric Lamb waves increases as frequency decreases, mode discrimination is improved to the point that it might be possible to eliminate the arrays 29, 47, 35 and 49 on the bottom of the substrate.

Since changes may be made in the above described apparatus without departing from the scope of the present invention, it is intended that the above description and drawing be interpreted as illustrative and not in a limiting sense. Further, the teachings of U.S. patent application Ser. No. 615,030, entitled, "Acoustic Touch Position Sensor," and filed concurrently herewith is incorporated herein by reference as an example of various modifications to the present invention coming within the scope of the invention.

What is claimed and desired to be secured by Letters Patent is:

1. A touch position sensor comprising:
    a substrate capable of supporting antisymmetric and symmetric Lamb waves propagating therein, said substrate having a touch surface;
    first means coupled to said substrate for imparting a Lamb wave into said substrate, said Lamb wave propagating along a first axis;
    first means disposed along said first axis for reflecting portions of said to Lamb wave along first parallel paths extending across the touch surface of said substrate, each first path representing a different axial position, a touch on said substrate touch surface forming a perturbation in a Lamb wave propagating along a first path intersecting the position of said touch; and
    means for sensing the occurrence of a perturbation in said Lamb waves to determine the axial position of a touch on said substrate relative to said first axis.

2. A touch position sensor as recited in claim 1 wherein said reflecting means reflects one type of said Lamb wave, either antisymmetric Lamb wave or symmetric Lamb waves and said reflecting means suppresses the other type of said Lamb wave to prevent interference of said other type of Lamb wave with said one type of Lamb wave.

3. A touch position sensor as recited in claim 2 wherein said reflecting means includes means for suppressing said symmetric Lamb wave.

4. A touch position sensor as recited in claim 2 wherein said reflecting means includes means for suppressing said antisymmetric Lamb wave.

5. A touch position sensor as recited in claim 1 wherein said sensing means includes
    second means disposed along an axis generally parallel to said first axis and positioned across said substrate touch surface from said first reflecting means for reflecting Lamb waves from said first reflecting means along said parallel axis and
    means coupled to said substrate for receiving said Lamb waves propagating along said parallel axis to provide a signal representative thereof.

6. A touch position sensor as recited in claim 5 wherein said imparting means includes a transmitting transducer coupled to a side of said substrate perpendicular to said first axis and said receiving means includes a transducer coupled to said substrate side spaced from said transmitting transducer and generally perpendicular to the axis of said second reflecting means.

7. A touch position sensor as recited in claim 1 wherein said substrate includes means for reflecting Lamb waves propagating along said first paths back along said first paths to said first reflecting means, said first reflecting means reflecting said reflected Lamb waves along said first axis to said imparting means and said imparting means being responsive to Lamb waves propagated thereto to provide a signal representative of said Lamb waves, said signal being coupled to said perturbation sensing means.

8. A touch position sensor as recited in claim 1 further including
    second means for imparting a Lamb wave into said substrate, said Lamb wave propagating along a second axis generally perpendicular to said first axis;
    second means disposed along said second axis for reflecting portions of said Lamb wave along second parallel paths extending across the touch surface of said substrate, each path representing different axial position relative to said second axis, a touch on said substrate touch surface forming a perturbation in a Lamb wave propagating along a path intersecting the position of said touch;
    said sensing means sensing the occurrence of a perturbation in said Lamb wave to determine the axial position of a touch on said substrate relative to said second axis.

9. A touch position sensor as recited in claim 1 wherein said substrate is formed of glass.

10. A touch position sensor as recited in claim 9 wherein said glass is tempered.

11. A touch position sensor as recited in claim 9 wherein said glass is frosted.

12. A touch position sensor as recited in claim 1 wherein said substrate is formed of metal.

13. A touch position sensor as recited in claim 1 wherein said substrate is formed of plastic.

14. A touch position sensor as recited in claim 1 wherein said substrate is formed of a ceramic.

15. A touch position sensor as recited in claim 1 wherein said imparting means includes a wedge mounted on said substrate and a transducer mounted on said wedge, said transducer vibrating in a manner to generate a compressional wave in said wedge wherein said compressional wave imparts a Lamb wave into said substrate.

16. A touch position sensor as recited in claim 15 wherein said wedge has a wedge angle that is equal to the arcsine of the phase velocity of either of said antisymmetric or symmetric Lamb waves divided by the phase velocity of said compressional wave.

17. A touch position sensor as recited in claim 1 wherein said imparting means includes a compression transducer mounted on a side said substrate perpendicular to said first axis for imparting said Lamb waves into said substrate.

18. A touch position sensor as recited in claim 1 wherein said imparting means includes a symmetric Lamb wave generator.

19. A touch position sensor as recited in claim 18 wherein said symmetric Lamb wave generator includes a length expander generator mounted on a side of said substrate.

20. A touch position sensor as recited in claim 18 wherein said symmetric Lamb wave generator includes a compression transducer mounted on a side of said substrate.

21. A touch position sensor as recited in claim 1 wherein said imparting means includes an antisymmetric Lamb wave generator.

22. A touch position sensor as recited in claim 21 wherein said antisymmetric Lamb wave generator includes a pair of compressional transducers mounted on a side of said substrate and vertically aligned; and drive signal means for generating a sine wave drive signal and the compliment of said sine wave drive signal wherein the sine wave drive signal is applied to one of said transducers and the compliment drive signal is applied to the other of said transducer.

23. A touch position sensor comprising:
 a substrate capable of supporting Lamb waves propagating therein said substrate having a touch surface and said Lamb waves having an antisymmetric mode and a symmetric mode;
 means coupled to said substrate for imparting a Lamb wave into said substrate, said Lamb wave propagating along a first axis;
 a first array of reflecting elements disposed on said substrate along said first axis for reflecting Lamb waves along first parallel paths extending across the touch surface of said substrate, each first path representing a different axial position relative to said first axis and a touch on said substrate touch surface forming a perturbation in a Lamb wave propagating along a first path intersecting the position of said touch;
 means disposed on said substrate relative to said first array for suppressing one of said Lamb wave modes;
 a second array of reflecting elements disposed along an axis generally parallel to said first axis for reflecting said Lamb waves along said parallel axis; and
 means coupled to said substrate for sensing Lamb waves propagating along said parallel axis to provide a signal representative thereof; and
 means responsive to said signal for determining the axial position of a touch on said substrate touch surface relative to said first axis.

24. A touch position sensor as recited in claim 23 wherein said first array is disposed on a first surface of said substrate and said suppressing means includes an array of reflecting elements disposed on a surface of said substrate opposite to said first surface and aligned with the elements of said first array to suppress said antisymmetric mode.

25. A touch position sensor as recited in claim 23 wherein said first array is disposed on a first surface of said substrate and said suppressing means includes an array of reflecting elements disposed on a surface of said substrate opposite to said first surface and shifted relative to the first array by an amount approximately equal to the wavelength of a symmetric mode Lamb wave divided by two to suppress said symmetric mode.

26. A touch position sensor as recited in claim 25 wherein said Lamb waves are first order Lamb waves.

27. A touch position sensor as recited in claim 25 wherein the elements of said suppressing means array are shifted from the elements of said first reflecting array in a direction at right angles to said first axis.

28. A touch position sensor as recited in claim 25 wherein the elements of said suppressing means array are shifted from the elements of said first reflecting array in a direction along said first axis.

29. A touch position sensor as recited in claim 23 further including:
 second means coupled to said substrate for imparting a shear wave propagating along a second axis, said second axis intersecting said first axis;
 a third array of reflecting elements disposed along said second axis for reflecting portions of said Lamb wave along second parallel paths extending across the touch surface of said substrate, each second path representing a different axial position relative to said second axis and a touch on said substrate touch surface forming a perturbation in a Lamb wave propagating along a second path intersecting the position of said touch;
 means disposed on said substrate relative to said third array for suppressing one of said modes;
 a fourth array of converting elements disposed along an axis generally parallel to said second axis for reflecting Lamb waves propagating on said second paths along an axis generally parallel to said second axis; and
 second means coupled to said substrate for sensing shear waves propagating along said axis parallel to said second axis to provide a signal representative thereof, said position determining means being coupled to said second sensing means to determine the position of a touch on said substrate touch surface relative to said second axis.

30. A touch position sensor as recited in claim 23 wherein said substrate is formed of glass.

31. A touch position sensor as recited in claim 30 wherein said glass is tempered.

32. A touch position sensor as recited in claim 30 wherein said glass is frosted.

33. A touch position sensor as recited in claim 23 wherein said substrate is formed of metal.

34. A touch position sensor as recited in claim 23 wherein said substrate is formed of plastic.

35. A touch position sensor as recited in claim 23 wherein said substrate is formed of a ceramic.

36. A touch position sensor as recited in claim 23 wherein said imparting means includes a wedge mounted on said substrate and a transducer mounted on said wedge, said transducer vibrating in a manner to generate a compressional wave in said wedge wherein said compressional wave imparts a Lamb wave into said substrate.

37. A touch position sensor as recited in claim 36 wherein said wedge has a wedge angle that is equal to the arcsine of the phase velocity of either of said antisymmetric or symmetric Lamb waves divided by the phase velocity of said compressional wave.

38. A touch position sensor as recited in claim 23 wherein said imparting means includes a compression transducer mounted on a side said substrate perpendicular to said first axis for imparting said Lamb waves into said substrate.

39. A touch position sensor as recited in claim 23 wherein said imparting means includes a symmetric Lamb wave generator.

40. A touch position sensor as recited in claim 39 wherein said symmetric Lamb wave generator includes a length expander generator mounted on a side of said substrate.

41. A touch position sensor as recited in claim 39 wherein said symmetric Lamb wave generator includes a compression transducer mounted on a side of said substrate.

42. A touch position sensor as recited in claim 23 wherein said imparting means includes an antisymmetric Lamb wave generator.

43. A touch position sensor as recited in claim 42 wherein said antisymmetric Lamb wave generator includes a pair of compressional transducers mounted on a side of said substrate and vertically aligned; and drive signal means for generating a sine wave drive signal and the compliment of said sine wave drive signal wherein the sine wave drive signal is applied to one of said transducers and the compliment drive signal is applied to the other of said transducer.

44. A touch position sensor comprising:
a substrate capable of supporting Lamb waves propagating therein, said substrate having a touch surface and said Lamb waves having a symmetric and antisymmetric mode;
first means coupled to said substrate for imparting a Lamb wave into said substrate, said Lamb wave propagating along a first axis;
a first array of reflecting elements disposed on said substrate along said first axis for reflecting said Lamb wave along first parallel paths extending across the touch surface of said substrate, each first path representing a different axial position relative to said first axis and a touch on substrate touch surface forming a perturbation in a Lamb wave propagating along a first path intersecting the position of said touch;
means disposed on said substrate relative to said first array for suppressing one of said modes;
means disposed generally parallel to said first axis and spaced from said first array for reflecting Lamb waves propagating along said first parallel paths back along said first parallel paths to said first array of reflecting elements, said reflecting elements reflecting said reflected Lamb waves along said first axis to said first imparting means and said first imparting means being responsive to Lamb waves propagated thereto to provide a signal representative of said Lamb waves; and
means responsive to said signal for determining the position of a touch on said substrate relative to said first axis.

45. A touch position sensor as recited in claim 44 wherein said first array is disposed on a first surface of said substrate and said suppressing means includes an array of reflecting elements disposed on a surface of said substrate opposite to said first surface and aligned with the elements of said first array to suppress said antisymmetric mode.

46. A touch position sensor as recited in claim 44 wherein said first array is disposed on a first surface of said substrate and said suppressing means includes an array of reflecting elements disposed on a surface of said substrate opposite to said first surface and shifted relative to the first array by an amount approximately equal to the wavelength of a symmetric mode Lamb wave divided by two to suppress said symmetric mode.

47. A touch position sensor as recited in claim 46 wherein said Lamb waves are first order Lamb waves.

48. A touch position sensor as recited in claim 46 wherein the elements of said suppressing array are shifted from the elements of said first reflecting array in the direction at right angles to said first axis.

49. A touch position sensor as recited in claim 46 wherein the elements of said suppressing array are shifted from the elements of said first reflecting array in a direction along said first axis.

50. A touch position sensor as recited in claim 44 wherein said reflecting means includes a reflective edge of said substrate.

51. A touch position sensor as recited in claim 44 further including
second means coupled to said substrate for imparting a Lamb wave propagating along a second axis, said second axis intersecting said first axis;
a second array of reflecting elements disposed along said second axis for reflecting portions of said Lamb wave along second parallel paths extending across the touch surface of said substrate, each second path representing a different axial position relative to said second axis and a touch on said substrate touch surface forming a perturbation in a Lamb wave propagating along a second path intersecting the position of said touch;
means disposed on said substrate relative to said second array for suppressing one of said modes;
means disposed generally parallel to said second axis and spaced from said second array for reflecting Lamb waves propagating along said second parallel paths back along said second paths to said second array of reflecting elements, said reflecting elements reflecting said reflected Lamb waves along said second axis to said second imparting means and said second imparting means being responsive to Lamb waves propagated thereto to provide a signal representative of said Lamb waves, said position determining means being coupled to said second imparting means to determine the position of a touch on said substrate relative to said second axis.

52. A touch position sensor as recited in claim 44 wherein said substrate is formed of glass.

53. A touch position sensor as recited in claim 52 wherein said glass is tempered.

54. A touch position sensor as recited in claim 52 wherein said glass is frosted.

55. A touch position sensor as recited in claim 44 wherein said substrate is formed of metal.

56. A touch position sensor as recited in claim 44 wherein said substrate is formed of plastic.

57. A touch position sensor as recited in claim 44 wherein said substrate is formed of a ceramic.

58. A touch position sensor as recited in claim 44 wherein said imparting means includes a wedge mounted on said substrate and a transducer mounted on said wedge, said transducer vibrating in a manner to generate a compressional wave in said wedge wherein said compressional wave imparts a Lamb wave into said substrate.

59. A touch position sensor as recited in claim 58 wherein said wedge has a wedge angle that is equal to the arcsine of the phase velocity of either of said antisymmetric or symmetric Lamb waves divided by the phase velocity of said compressional wave.

60. A touch position sensor as recited in claim 44 wherein said imparting means includes a compression transducer mounted on a side said substrate perpendicular to said first axis for imparting said Lamb waves into said substrate.

61. A touch position sensor as recited in claim 44 wherein said imparting means includes a symmetric Lamb wave generator.

62. A touch position sensor as recited in claim 61 wherein said symmetric Lamb wave generator includes a length expander generator mounted on a side of said substrate.

63. A touch position sensor as recited in claim 61 wherein said symmetric Lamb wave generator includes a compression transducer mounted on a side of said substrate.

64. A touch position sensor as recited in claim 44 wherein said imparting means includes an antisymmetric Lamb wave generator.

65. A touch position sensor as recited in claim 64 wherein said antisymmetric Lamb wave generator includes a pair of compressional transducers mounted on a side of said substrate and vertically aligned; and drive signal means for generating a sine wave drive signal and the compliment of said sine wave drive signal wherein the sine wave drive signal is applied to one of said transducers and the compliment drive signal is applied to the other of said transducer.

66. A touch position sensor comprising:
a substrate capable of supporting Lamb waves propagating therein, said substrate having a touch surface and said Lamb waves having a symmetric mode and an antisymmetric mode;
means coupled to said substrate for imparting a Lamb wave into said substrate, said Lamb wave propagating along a first axis;
a first array of reflecting elements disposed on said substrate along said first axis for reflecting said Lamb wave along first parallel paths extending across the touch surface of said substrate, each first path representing a different axial position relative to said first axis and a touch on said substrate touch surface forming a perturbation in a Lamb wave propagating along a first path intersecting the position of said touch;
means disposed on said substrate relative to said first array for suppressing one of said modes;
means disposed generally parallel to said first axis and spaced from said first array for reflecting Lamb waves propagating along said first parallel paths back along said first parallel paths to said first array of reflecting elements, said reflecting elements reflecting said reflected Lamb waves along said first axis to said first imparting means and said first imparting means being responsive to Lamb waves propagated thereto to provide a signal representative of said Lamb waves;
a second array of reflecting elements disposed along a second axis intersecting said first axis for reflecting portions of a Lamb wave along second parallel paths extending across the touch surface of said substrate, each second path representing a different axial position relative to said second axis and a touch on said substrate touch surface forming a perturbation in a Lamb wave propagating along a second path intersecting the position of said touch;
means for reflecting a shear wave propagating along said first axis to said second array for propagation along said second axis;
means disposed on said substrate relative to said second array for suppressing one of said modes;
means disposed generally parallel to said second axis and spaced from said second array for reflecting Lamb waves propagating along said second parallel paths back along said second paths to said second array of reflecting elements for reflecting said reflected Lamb waves along said second axis said reflecting means and said reflecting means reflecting said Lamb waves reflected from said second array back along said first axis to said imparting means, said imparting means being responsive to Lamb waves to provide a signal representative thereof; and
means responsive to said signals for determining the position of a touch on said substrate touch surface relative to said first and second axes.

67. A touch position sensor as recited in claim 66 wherein said substrate is formed of glass.

68. A touch position sensor as recited in claim 67 wherein said glass is tempered.

69. A touch position sensor as recited in claim 67 wherein said glass is frosted.

70. A touch position sensor as recited in claim 66 wherein said substrate is formed of metal.

71. A touch position sensor as recited in claim 66 wherein said substrate is formed of plastic.

72. A touch position sensor as recited in claim 66 wherein said substrate is formed of a ceramic.

73. A touch position sensor as recited in claim 66 wherein said imparting means includes a wedge mounted on said substrate and a transducer mounted on said wedge, said transducer vibrating in a manner to generate a compressional wave in said wedge wherein said compressional wave imparts a Lamb wave into said substrate.

74. A touch position sensor as recited in claim 73 wherein said wedge has a wedge angle that is equal to the arcsine of the phase velocity of either of said antisymmetric or symmetric Lamb waves divided by the phase velocity of said compressional wave.

75. A touch position sensor as recited in claim 66 wherein said imparting means includes a compression transducer mounted on a side said substrate perpendicular to said first axis for imparting said Lamb waves into said substrate.

76. A touch position sensor s recited in claim 66 wherein said imparting means includes a symmetric Lamb wave generator.

77. A touch position sensor as recited in claim 76 wherein said symmetric Lamb wave generator includes a length expander generator mounted on a side of said substrate.

78. A touch position sensor as recited in claim 76 wherein said symmetric Lamb wave generator includes a compression transducer mounted on a side of said substrate.

79. A touch position sensor as recited in claim 66 wherein said imparting means includes an antisymmetric Lamb wave generator.

80. A touch position sensor as recited in claim 79 wherein said antisymmetric Lamb wave generator includes a pair of compressional transducers mounted on a side of said substrate and vertically aligned; and drive signal means for generating a sine wave drive signal and the compliment of said sine wave drive signal wherein the sine wave drive signal is applied to one of said transducers and the compliment drive signal is applied to the other of said transducer.

* * * * *